United States Patent
Meiri et al.

(10) Patent No.: US 10,691,551 B2
(45) Date of Patent: Jun. 23, 2020

(54) STORAGE SYSTEM WITH SNAPSHOT GENERATION CONTROL UTILIZING MONITORED DIFFERENTIALS OF RESPECTIVE STORAGE VOLUMES

(71) Applicant: EMC IP Holding Company LLC, Hopkinton, MA (US)

(72) Inventors: David Meiri, Somerville, MA (US); Anton Kucherov, Dudley, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/044,016

(22) Filed: Jul. 24, 2018

(65) Prior Publication Data
US 2020/0034246 A1 Jan. 30, 2020

(51) Int. Cl.
*G06F 11/14* (2006.01)
*G06F 11/30* (2006.01)

(52) U.S. Cl.
CPC ...... *G06F 11/1461* (2013.01); *G06F 11/1464* (2013.01); *G06F 11/3034* (2013.01); *G06F 2201/84* (2013.01); *G06F 2201/88* (2013.01)

(58) Field of Classification Search
CPC ............. G06F 11/1461; G06F 11/1464; G06F 11/3034

(Continued)

(56) References Cited

U.S. PATENT DOCUMENTS 7,444,464 B2  10/2008  Urmston et al.
7,836,266 B2 * 11/2010  Zohar ................. G06F 11/1458
                                                      711/161

(Continued)

FOREIGN PATENT DOCUMENTS

WO     2016111954 A1     7/2016

OTHER PUBLICATIONS

J. Yang, Q. Cao, X. Li, C. Xie and Q. Yang, "ST-CDP: Snapshots in TRAP for Continuous Data Protection," in IEEE Transactions on Computers, vol. 61, No. 6, pp. 753-766, Jun. 2012.*

(Continued)

*Primary Examiner* — Pierre Miche Bataille
(74) *Attorney, Agent, or Firm* — Ryan, Mason & Lewis, LLP

(57) ABSTRACT

A storage system in one embodiment comprises a plurality of storage devices and a storage controller. The storage controller is configured to monitor a differential between a storage volume of the storage system and a previous snapshot generated for that storage volume, and responsive to the monitored differential satisfying one or more specified conditions, to generate a subsequent snapshot for the storage volume. For example, monitoring the differential between the storage volume of the storage system and the previous snapshot generated for that storage volume illustratively comprises maintaining a counter indicative of an amount of data in the storage volume that has been written since generation of the previous snapshot. In such an arrangement, generating the subsequent snapshot for the storage volume responsive to the monitored differential satisfying one or more specified conditions illustratively comprises generating the subsequent snapshot responsive to the counter exceeding a specified threshold.

20 Claims, 6 Drawing Sheets

(58) Field of Classification Search
USPC ........................................................ 711/162
See application file for complete search history.

(56) References Cited

U.S. PATENT DOCUMENTS

| | | | |
|---|---|---|---|
| 8,095,726 B1 | 1/2012 | O'Connell et al. | |
| 8,214,612 B1 | 7/2012 | Natanzon | |
| 9,104,326 B2 | 8/2015 | Frank et al. | |
| 9,208,162 B1 | 12/2015 | Hallak et al. | |
| 9,286,003 B1 | 3/2016 | Hallak et al. | |
| 9,606,870 B1 | 3/2017 | Meiri et al. | |
| 9,716,754 B2 | 7/2017 | Swift | |
| 2006/0047931 A1* | 3/2006 | Saika ................ | G06F 11/1451 711/162 |
| 2007/0150677 A1* | 6/2007 | Homma ............. | G06F 11/2082 711/162 |
| 2007/0162716 A1* | 7/2007 | Yagisawa ........... | G06F 11/1435 711/162 |
| 2008/0140963 A1* | 6/2008 | Thomason ......... | G06F 11/1435 711/162 |
| 2008/0279462 A1 | 11/2008 | Celi, Jr. | |
| 2009/0132955 A1 | 5/2009 | Garg et al. | |
| 2009/0216977 A1* | 8/2009 | Watanabe ........... | G06F 3/0608 711/162 |
| 2010/0023716 A1* | 1/2010 | Nemoto ............. | G06F 11/1451 711/162 |
| 2010/0179941 A1 | 7/2010 | Agrawal et al. | |
| 2013/0325824 A1 | 12/2013 | Shoens | |
| 2014/0181016 A1 | 6/2014 | Whitehead et al. | |
| 2016/0150012 A1 | 5/2016 | Barszczak et al. | |
| 2016/0170987 A1 | 6/2016 | Kesselman | |
| 2016/0202927 A1 | 7/2016 | Klarakis et al. | |
| 2016/0224259 A1 | 8/2016 | Ahrens et al. | |
| 2017/0034064 A1* | 2/2017 | Everhart ............ | H04L 47/25 |
| 2017/0091045 A1* | 3/2017 | Bangalore .......... | G06F 11/1461 |
| 2017/0123701 A1* | 5/2017 | Lee .................. | G06F 11/1464 |
| 2017/0192857 A1 | 7/2017 | Meiri et al. | |
| 2019/0332498 A1* | 10/2019 | Mallik .............. | G06F 11/2097 |

OTHER PUBLICATIONS

EMC Corporation, "Introduction to the EMC XtremIO Storage Array (Ver. 4.0): A Detailed Review," White Paper, Apr. 2015, 65 pages.

EMC Corporation, "Unstoppable Data Reduction: Always-on, In-Line, Zero-Penalty, Enterprise-Class, Free," https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Rash Array," Data Sheet, 2017, 5 pages.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

* cited by examiner

STORAGE SYSTEM WITH SNAPSHOT GENERATION CONTROL UTILIZING MONITORED DIFFERENTIALS OF RESPECTIVE STORAGE VOLUMES

FIELD

The field relates generally to information processing systems, and more particularly to storage in information processing systems.

BACKGROUND

In many storage systems, it is desirable to generate periodic snapshots of storage volumes. A given such snapshot illustratively represents a point-in-time replica of a particular storage volume of the storage system. Such snapshots are commonly used in a wide variety of different data protection scenarios. For example, periodic snapshots are created in a storage system in order to enable users to recover from data corruption by restoring one or more storage volumes using a previous point-in-time replica. As another example, snapshots may be used in conjunction with synchronous or asynchronous replication of data from a storage system at one site to a storage system at another site, in order to support disaster recovery functionality. Conventional snapshot generation arrangements typically involve the use of a snapshot scheduler that is configured to create periodic snapshots at fixed intervals, following a predetermined schedule. For example, the snapshot scheduler can cause a snapshot of a given storage volume to be created every hour, or at a particular time every day. However, if the intervals are too short, such that snapshots are taken more frequently than needed, substantial amounts of computational and memory resources of the storage system are wasted. It is also possible that the intervals may be too long, such that snapshots are taken less frequently than needed, undermining the data protection provided by the storage system.

SUMMARY

Illustrative embodiments provide efficient snapshot generation control in a storage system based at least in part on monitored differentials of respective storage volumes in the storage system. For example, one or more such embodiments can be advantageously configured to control generation of snapshots for a given storage volume of the storage system based at least in part on an amount of data in the storage volume that has been written since a previous snapshot of that storage volume was taken. Such arrangements dynamically adapt the snapshot generation in the storage system to better match the manner in which the data of the storage volume is changing over time, thereby conserving computational and memory resources of the storage system while also providing improved data protection. Accordingly, illustrative embodiments disclosed herein can considerably reduce the amounts of storage system computational and memory resources that are consumed in generating and storing snapshots, thereby leading to improved storage system performance.

These embodiments illustratively include a clustered implementation of a content addressable storage system having a distributed storage controller. Similar advantages can be provided in other types of storage systems.

In one embodiment, a storage system comprises a plurality of storage devices and a storage controller. The storage controller is configured to monitor a differential between a storage volume of the storage system and a previous snapshot generated for that storage volume, and responsive to the monitored differential satisfying one or more specified conditions, to generate a subsequent snapshot for the storage volume.

The storage volume illustratively comprises at least one logical storage volume comprising at least a portion of a physical storage space of one or more of the storage devices. The term "storage volume" as used herein is therefore intended to be broadly construed, so as to encompass a set of one or more logical storage volumes.

In some embodiments, generating the subsequent snapshot for the storage volume responsive to the monitored differential satisfying one or more specified conditions illustratively comprises scheduling the generation of the subsequent snapshot, and generating the subsequent snapshot in accordance with the scheduling.

The one or more specified conditions in some embodiments include a specified minimum amount of change in the storage volume relative to the previous snapshot of the storage volume. For example, the specified minimum amount of change in the storage volume may be specified in terms of at least one of a minimum number of storage units of the storage volume that have changed since generation of the previous snapshot, and a minimum percentage of the storage volume that has changed since generation of the previous snapshot.

In some embodiments, monitoring the differential between the storage volume of the storage system and the previous snapshot generated for that storage volume illustratively comprises maintaining a counter indicative of an amount of data in the storage volume that has been written since generation of the previous snapshot. In an embodiment of this type, generating the subsequent snapshot for the storage volume responsive to the monitored differential satisfying one or more specified conditions illustratively comprises generating the subsequent snapshot responsive to the counter exceeding a specified threshold.

In other embodiments, monitoring the differential between the storage volume of the storage system and the previous snapshot generated for that storage volume illustratively comprises maintaining a first counter indicative of a total amount of data in the storage volume, maintaining a second counter indicative of an amount of data in the storage volume that has been written since generation of the previous snapshot, and monitoring values of the first and second counters. In an embodiment of this type, generating the subsequent snapshot for the storage volume responsive to the monitored differential satisfying one or more specified conditions illustratively comprises generating the subsequent snapshot responsive to the value of the second counter satisfying a specified condition relative to the value of the first counter.

The storage system in some embodiments comprises a content addressable storage system implemented utilizing non-volatile memory storage devices, such as flash-based storage devices. For example, the storage devices of the storage system in such embodiments can be configured to collectively provide an all-flash storage array. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
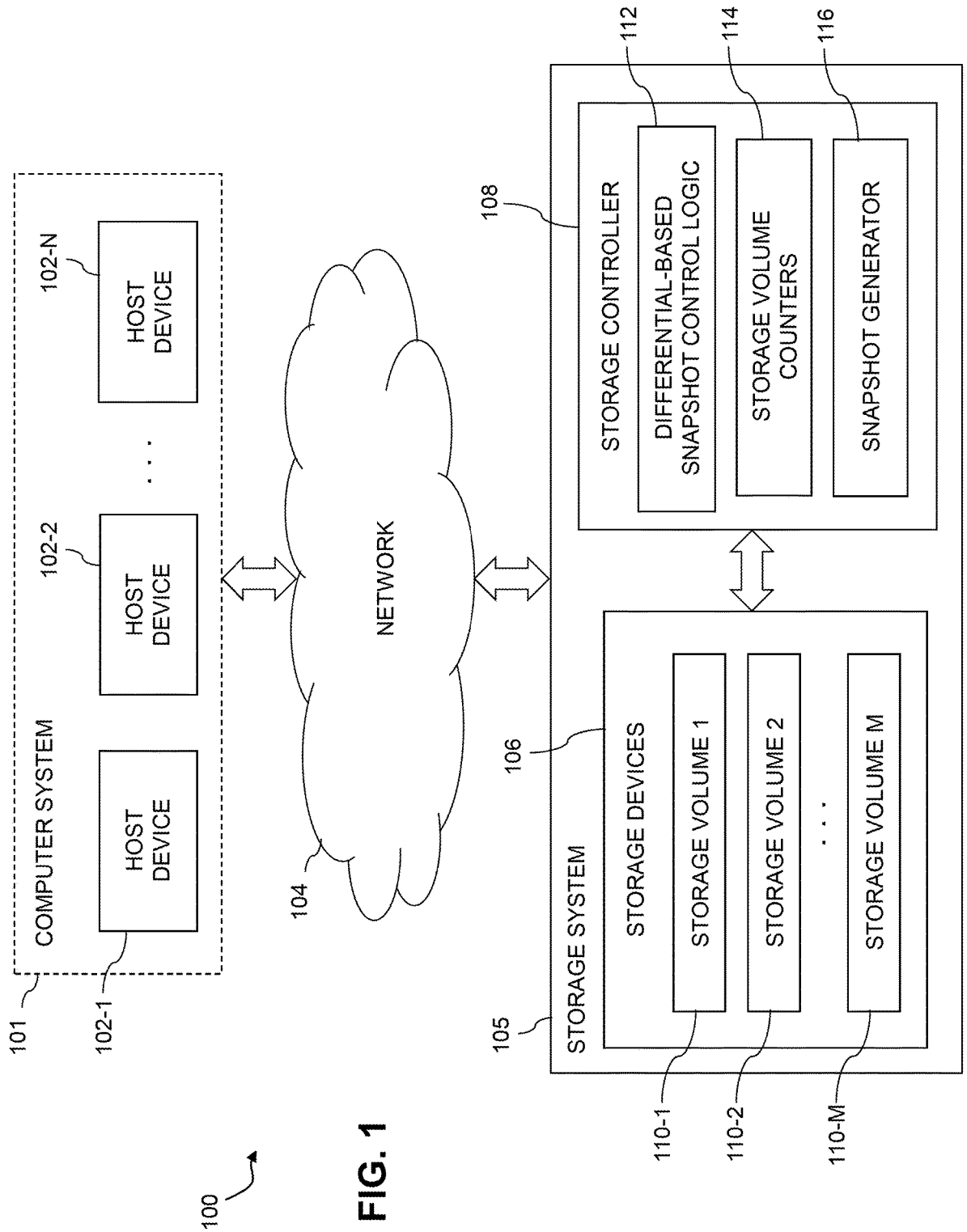
FIG. 1 is a block diagram of an information processing system comprising a storage system configured with functionality for snapshot generation control utilizing monitored differentials of respective storage volumes in an illustrative embodiment.

FIG. 1 shows an information processing system 100 configured in accordance with an illustrative embodiment. The information processing system 100 comprises a computer system 101 that includes host devices 102-1, 102-2, . . . 102-N. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and storage system 105 include Google Cloud Platform (GCP) and Microsoft Azure.

The host devices 102 and the storage system 105 may be implemented on a common processing platform, or on separate processing platforms.

The host devices 102 are configured to write data to and read data from the storage system 105 in accordance with applications executing on those host devices 102 for system users.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106 and an associated storage controller 108. The storage devices 106 store storage volumes 110-1, 110-2, . . . 110-M. The storage volumes 110 illustratively comprise respective logical units (LUNs) or other types of logical storage volumes.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array from Dell EMC of Hopkinton, Mass. Other types of storage arrays, including by way of example VNX® and Symmetrix VMAX® storage arrays also from Dell EMC, can be used to implement storage system 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The storage controller 108 of storage system 105 in the FIG. 1 embodiment includes differential-based snapshot control logic 112 and associated storage volume counters 114. The differential-based snapshot control logic 112 is configured to control performance of a differential-based snapshot generation process such as that illustrated in the flow diagram of FIG. 2, utilizing the storage volume counters 114. The storage volume counters are maintained in a memory of the storage system 105 under the control of the differential-based snapshot control logic 112. The storage controller 108 further comprises a snapshot generator 116. The storage controller 108 and storage system 105 should also be understood to include additional modules and other components typically found in conventional implementations of storage controllers and storage systems, although such additional modules and other components are omitted from the figure for clarity and simplicity of illustration.

The storage controller 108 via its differential-based snapshot control logic 112, storage volume counters 114 and snapshot generator 116 is configured to monitor a differential between a storage volume of the storage system 105 and a previous snapshot generated for that storage volume, and responsive to the monitored differential satisfying one or more specified conditions, to generate a subsequent snapshot for the storage volume.

A given storage volume designated for differential-based generation of snapshots in the storage system 105 illustratively comprises a set of one or more LUNs or other instances of the storage volumes 110 of the storage system 105. Each such LUN or other storage volume illustratively comprises at least a portion of a physical storage space of one or more of the storage devices 106.

In some embodiments, generating the subsequent snapshot for the storage volume responsive to the monitored differential satisfying one or more specified conditions comprises scheduling the generation of the subsequent snapshot, and generating the subsequent snapshot in accordance with the scheduling, where the scheduling occurs responsive to the monitored differential satisfying the one or more specified conditions. Accordingly, terms such as "generating a snapshot" as used herein are intended to be broadly construed so as to encompass, for example, scheduling the generation of a snapshot, where the snapshot is subsequently generated in accordance with the schedule.

The one or more specified conditions illustratively comprise a specified minimum amount of change in the storage volume relative to the previous snapshot of the storage volume. For example, the specified minimum amount of change in the storage volume can be specified in terms of at least one of a minimum number of storage units of the storage volume that have changed since generation of the previous snapshot, and a minimum percentage of the storage volume that has changed since generation of the previous snapshot. The term "storage units" in this example refers to a measure of storage capacity, such as megabytes (MB) or gigabytes (GB), although other similar storage units can be used.

In some embodiments, monitoring the differential between the storage volume of the storage system 105 and the previous snapshot generated for that storage volume comprises maintaining a corresponding counter in the storage volume counters 114 indicative of an amount of data in the storage volume that has been written since generation of the previous snapshot. The counter is illustratively one of the plurality of storage volume counters 114 maintained for respective ones of the storage volumes 110. In an embodiment of this type, generating the subsequent snapshot for the storage volume responsive to the monitored differential satisfying one or more specified conditions illustratively comprises generating the subsequent snapshot responsive to the counter exceeding a specified threshold. The counter is reset in conjunction with the generation of the subsequent snapshot. An example of a differential-based snapshot generation process utilizing this approach will be described below in conjunction with the flow diagram of FIG. 2.

In other embodiments, monitoring the differential between the storage volume of the storage system 105 and the previous snapshot generated for that storage volume comprises maintaining a first counter indicative of a total amount of data in the storage volume, maintaining a second counter indicative of an amount of data in the storage volume that has been written since generation of the previous snapshot, and monitoring values of the first and second counters. In an embodiment of this type, generating the subsequent snapshot for the storage volume responsive to the monitored differential satisfying one or more specified conditions illustratively comprises generating the subsequent snapshot responsive to the value of the second counter satisfying a specified condition relative to the value of the first counter.

For example, the value of the second counter satisfying a specified condition relative to the value of the first counter comprises the value of the second counter reaching a specified percentage of the value of the first counter.

The second counter is illustratively reset in conjunction with the generation of the subsequent snapshot.

Maintaining a given one of the first and second counters illustratively comprises detecting one or more overwrites of existing data of the storage volume, and leaving the value of the given counter unchanged responsive to each of the one or more detected overwrites.

Maintaining the second counter illustratively comprises accessing an address-to-hash ("A2H") structure for the storage volume, determining if one or more portions of the storage volume have changed since generation of the previous snapshot based at least in part on respective corresponding entries of the A2H structure, and updating the second counter based at least in part on the determining.

The A2H structure illustratively comprises at least a portion of an A2H tree including logical addresses for respective pages of the storage volume in association with respective content-based signatures of those page, as well as additional fields to be described in more detail below in conjunction with the illustrative embodiments of FIGS. 2 and 3, such as an "old data" field that can be used to determine if a given write to a particular address is a first write to that address since generation of a previous snapshot.

The content-based signatures illustratively comprise hash digests of their respective pages, each generated by application of a hash function such as the well-known Secure Hashing Algorithm 1 (SHA1) to the content of its corresponding page. It is also possible that other types of content-based signatures may be used, such as hash handles of the type described elsewhere herein. A given content-based signature in illustrative embodiments is unique to the particular content of the page from which it is generated, such that two pages with exactly the same content will have the same content-based signature, while two pages with different content will have different content-based signatures.

As a more particular example of a two-counter embodiment, the first counter specifies the total amount of data in the storage volume (e.g., in bytes, or in pages), and the second counter specifies the total amount of data written since the last snapshot. In one possible implementation, the second counter is used to determine when it is time to take a new snapshot, and a differential-based snapshot generation process is configured to check whether or not the second counter is above a threshold. In another possible implementation, once the second counter is above a threshold corresponding to a certain percentage of the first counter (e.g., 0.1%), the new snapshot is taken. Once a new snapshot is taken, the second counter is reset to zero and the process begins again.

As indicated previously, special treatment is provided with regard to overwrites in some embodiments. For the first counter in the above two-counter example, any data that is overwritten is not counted since it does not increase the size of the storage volume. For the second counter, only data that is written since the last snapshot is counted. This can be done by observing the "old data" field in the above-noted A2H structure, as will be described in more detail below in conjunction with FIGS. 2 and 3.

Various automated actions may be taken in at least one of the host devices 102 and the storage system 105 based at least in part on snapshots generated in the manner described above. For example, the snapshots are utilized in some embodiments to allow users of the storage system 105 to recover from data corruption by restoring one or more storage volumes using a previous point-in-time replica. Accordingly, one or more snapshots can be used to support automated rollback of a storage volume or set of storage volumes to a previous point in time.

As another example, snapshots may be used in conjunction with synchronous or asynchronous replication of data from the storage system 105 at a production site or datacenter to another storage system at a recovery site or datacenter, in order to support disaster recovery functionality.

The above-described operations carried out in conjunction with a process for efficient generation of snapshots in the storage system 105 are illustratively performed at least in part under the control of the differential-based snapshot control logic 112. As is apparent from the foregoing description, such operations utilize the associated storage volume counters 114 as well as the snapshot generator 116.

The host devices 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as host devices 102, network 104, storage system 105, storage devices 106, storage controller 108 and storage volumes 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, functionality for differential-based snapshot generation and associated automated processing based at least in part on the resulting snapshots can be implemented in one or more host devices, or partially in a host device and partially in a storage system. Accordingly, illustrative embodiments are not limited to arrangements in which all such functionality is implemented in a storage system or a host device, and therefore encompass various hybrid arrangements in which the functionality is distributed over one or more storage systems and one or more associated host devices, each comprising one or more processing devices.

The operation of the information processing system 100 will now be described in further detail with reference to the flow diagram of the illustrative embodiment of FIG. 2. The process as shown includes steps 200 through 212, and is suitable for use in system 100 but is more generally applicable to other types of information processing systems in which a storage system is configured to generate snapshots for one or more storage volumes and to take one or more automated actions based at least in part on the generated snapshots. The steps are illustratively performed at least in part under the control of the differential-based snapshot control logic 112 in storage system 105 of system 100.

In step 200, at least one storage volume is designated for differential-based generation of snapshots. The storage volume is illustratively one of a plurality of logical storage volumes stored in a storage system, such as one of the storage volumes 110 stored in storage system 105 of system 100. Multiple storage volumes can be designated for differential-based generation of snapshots in step 200. For example, one or more sets of storage volumes each comprising a plurality of storage volumes can be designated. It will be assumed for clarity and simplicity of the following description that a single storage volume is designated, but the techniques described can be extended in a straightforward manner to multiple designated storage volumes as well as multiple sets of storage volumes.

In step 202, a snapshot is taken of the storage volume. Such a snapshot may be taken utilizing a snapshot generator such as snapshot generator 116 in the storage controller 108 of storage system 105.

In step 204, a counter is reset for the storage volume. The counter is illustratively a particular one of the storage volume counters 114 corresponding to a particular one of the storage volumes 110.

In step 206, the storage volume is monitored for writes. Such writes illustratively originate from one or more of the host devices 102 and are directed to the storage system 105 over the network 104.

In step 208, a determination is made as to whether or not a write has been received for the storage volume. If no write has been received for the storage volume, the process returns to step 206 to continue to monitor the storage volume for writes. Otherwise the process moves to step 210 as shown.

In step 210, the counter that was previously reset in step 204 is incremented if the received write is the first received write for a corresponding address of the storage volume since the last snapshot was taken. The address illustratively comprises a logical address identifying a particular page of the storage volume. This step is therefore configured to detect one or more overwrites of existing data of the storage volume, and to leave the value of the counter unchanged responsive to each of the one or more detected overwrites. Accordingly, it is only the first received write for a particular address of the storage volume that causes the counter to be incremented in step 210, and subsequent writes to that same address are considered overwrites and do not cause the counter to be incremented.

An A2H structure of the type to be described below in conjunction with FIG. 3 can be used to determine if a given write is the first write for a particular address of the storage volume. More particular, such an A2H structure illustratively provides, for each of a plurality of pages of the storage volume, a corresponding "old data" field that is utilized in performing the first write determination in step 210. For example, in some embodiments, generation of a new snapshot creates a new node in an A2H tree in which A2H entries are written. Once a given entry of a node is updated for a particular write, a subsequent write to the same address will overwrite that entry, and under this condition, which is detectable using the "old data" field, the counter is not incremented in step 210. The operation of taking a snapshot in step 202 in such an embodiment creates a new node in the A2H tree, and from this point on all writes appear as new writes until an overwrite arrives.

In step 212, a determination is made as to whether or not the counter for the storage volume is greater than a specified threshold. If the counter is greater than the threshold, the process returns to step 202 to take another snapshot of the storage volume and then the counter is reset in step 204 and the process continues to monitor the storage volume for writes in step 206. If the counter is not greater than the threshold, the process returns to step 206 to continue to monitor the storage volume for writes.

The threshold utilized in step 212 is selected to ensure that there has been a specified minimum amount of change in the storage volume since generation of the previous snapshot. For example, the minimum amount of change can be specified in terms of at least one of a minimum number of storage units of the storage volume that have changed since generation of the previous snapshot, and a minimum percentage of the storage volume that has changed since generation of the previous snapshot. Other arrangements of one or more thresholds can be used in other embodiments.

In some embodiments, a user specifies the minimal amount of change in the storage volume that is required before the storage system will generate a new snapshot. This amount can be in terms of, for example, storage units (e.g., 20 MB) or a percentage (e.g., 0.1% change in the storage volume). Other techniques can used in generating appropriate monitoring thresholds in other embodiments.

Figure 2:
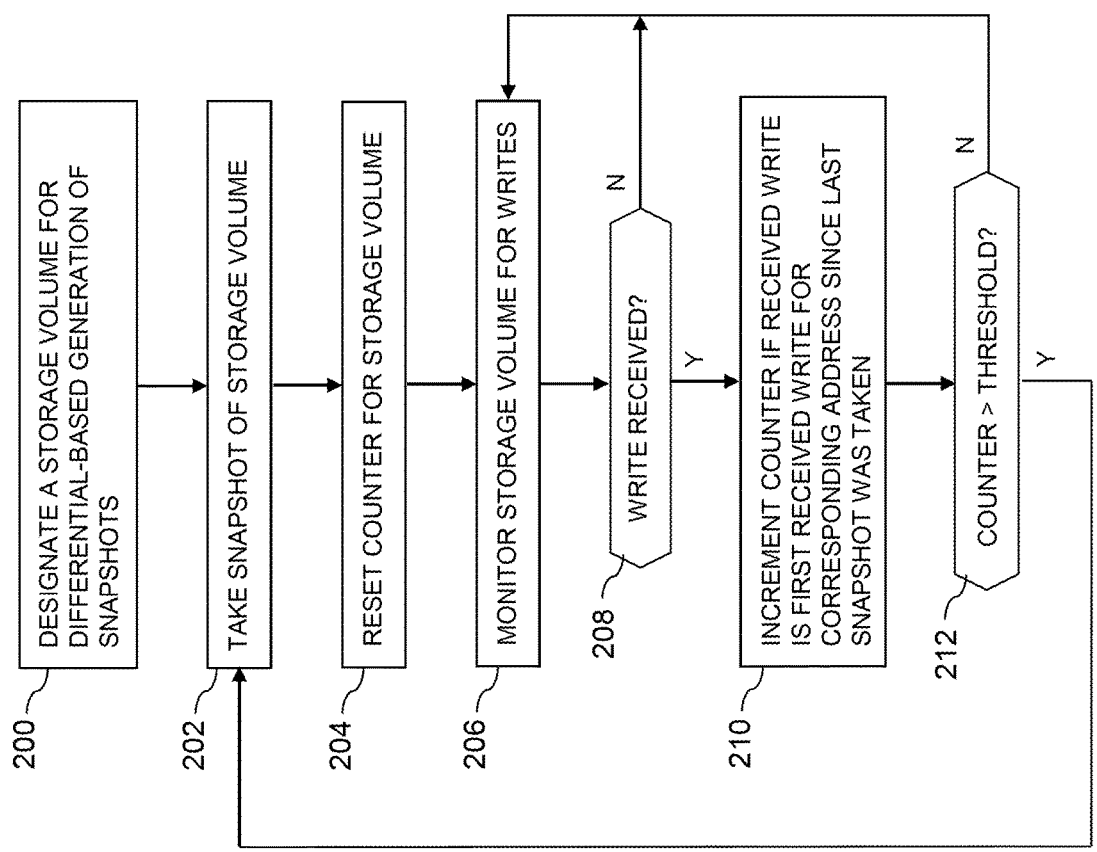
FIG. 2 is a flow diagram of a process for snapshot generation control utilizing monitored differentials of respective storage volumes in an illustrative embodiment.

The FIG. 2 process continues for as long as it is desirable to generate snapshots for the designated storage volume. The process can be terminated under various conditions, possibly specified by or under the control of the differential-based snapshot control logic 112, such as a change in the designation previously made in step 200, a remapping, rezoning or other reconfiguration of the storage volume within the storage system 105, or deletion of the storage volume from the storage system 105.

The illustrative embodiment of FIG. 2 is an example of a differential-based snapshot generation embodiment in which a differential between a storage volume of the storage system and a previous snapshot generated for that storage volume is monitored and, responsive to the monitored differential satisfying one or more specified conditions, a subsequent snapshot is generated for the storage volume. The term "differential" as used herein is intended to be broadly construed, so as to encompass a wide variety of different arrangements based at least in part on write counts as in the FIG. 2 embodiment, and other types of differentials can be monitored in other embodiments.

Also, the term "monitoring" as used herein is intended to be broadly construed, so as to encompass maintaining one or more counters and periodically or otherwise checking at least one of those counters against a corresponding threshold, as well as numerous other arrangements for tracking a differential so as to allow for a determination as to whether or not one or more specified conditions have been satisfied.

The counter value being greater than the threshold in step 212 in the FIG. 2 process is an example of what is more generally referred to herein as a "specified condition" that can be satisfied by a monitored differential between a storage volume and a previous snapshot generator for that storage volume. The specified condition in this embodiment comprises a specified minimum amount of change in the storage volume relative to a previous snapshot of the storage volume. More particularly, monitoring the differential between the storage volume of the storage system and the previous snapshot generated for that storage volume in this embodiment comprises maintaining a counter indicative of an amount of data in the storage volume that has been written since generation of the previous snapshot, and generating the subsequent snapshot for the storage volume responsive to the monitored differential satisfying one or more specified conditions comprises generating the subsequent snapshot responsive to the counter exceeding a specified threshold.

As indicated previously, subsequent overwrites for a particular address in the storage volume are ignored in step 210 of the FIG. 2 embodiment and therefore do not cause the counter to be incremented in this embodiment.

The snapshots generated by a storage system using the FIG. 2 process are utilized to perform one or more automated actions in the storage system. For example, the storage system may utilize one or more snapshots to support automated rollback of a storage volume or set of storage volumes to a previous point in time, or to perform synchronous or asynchronous replication of data of one or more storage volumes from the storage system to another storage system or to another portion of the same storage system. These and numerous other automated actions may be taken utilizing snapshots generated using the FIG. 2 process.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for generating snapshots. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different snapshot generation processes for respective different sets of one or more storage volumes or for different storage systems or portions thereof within a given information processing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 of storage system 105 that is configured to control performance of one or more steps of the FIG. 2 process in its corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controller 108, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In the illustrative embodiment of FIG. 2, a single counter is utilized in determining if a monitored differential between a storage volume and a previous snapshot generated for that storage volume satisfies one or more specified conditions. In other embodiments, multiple counters can be used. For example, alternative embodiments can be configured in which monitoring the differential between the storage volume of the storage system and the previous snapshot generated for that storage volume comprises maintaining a first counter indicative of a total amount of data in the storage volume, maintaining a second counter indicative of an amount of data in the storage volume that has been written since generation of the previous snapshot, and monitoring values of the first and second counters. In such an embodiment, generating the subsequent snapshot for the storage volume responsive to the monitored differential satisfying one or more specified conditions illustratively comprises generating the subsequent snapshot responsive to the value of the second counter satisfying a specified condition relative to the value of the first counter. For example, the value of the second counter satisfying a specified condition relative to the value of the first counter may comprise the value of the second counter reaching a specified percentage of the value of the first counter. In such an arrangement, the second counter is reset in conjunction with the generation of the subsequent snapshot, but the first counter is not reset. In maintaining at least a given one of the first and second counters, overwrites of existing data of the storage volume are detected, and the value of the given counter is left unchanged responsive to each of the one or more detected overwrites.

An embodiment of this type is illustratively configured to maintain the second counter by accessing an A2H structure for the storage volume, determining if one or more portions of the storage volume have changed since generation of the previous snapshot based at least in part on respective corresponding entries of the A2H structure, and updating the second counter based at least in part on the determining.

Figure 3:
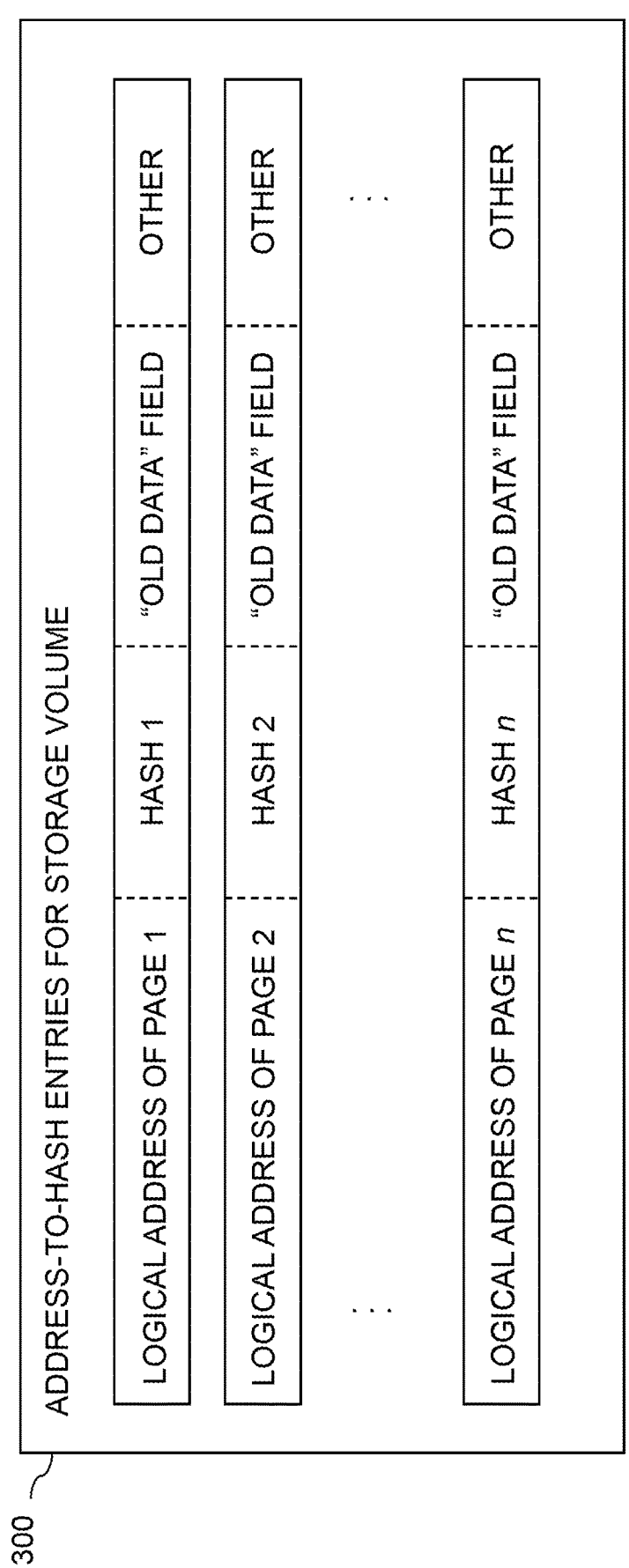
FIG. 3 shows an example of an address-to-hash structure in an illustrative embodiment.

An example of an A2H structure 300 for a given storage volume in an illustrative embodiment is shown in FIG. 3. The A2H structure 300 comprises a plurality of entries, each corresponding to the logical address of a different page of the storage volume. In addition to the logical address of a given page, each entry comprises a hash of the given page. The "hash" as used in this particular example is considered a type of content-based signature.

The hash values in respective entries of the A2H structure 300 may comprise at least respective portions of corresponding content-based signatures comprising hash digests of respective ones of the pages.

Additionally or alternatively, the hash values in respective entries of the A2H structure 300 may comprise respective hash handles corresponding to respective content-based signatures of respective ones of the pages.

The A2H structure 300 in some embodiments more particularly comprises at least a portion of an A2H tree or other type of A2H table configured to contain information mapping page logical addresses to respective hash values.

The content-based signatures are illustratively computed for respective pages of the storage volume using SHA1 or another type of secure hashing algorithm. Such a computation is assumed to be performed utilizing a storage controller such as storage controller 108 of storage system 105 in system 100.

Each of the entries of the A2H structure 300 further comprises a corresponding "old data" field. As indicated previously, the "old data" field is illustratively utilized in performing the first write determination in step 210 of the FIG. 2 embodiment, and in performing similar functions in other one-counter or multi-counter embodiments. One or more additional fields may be included in each entry, as denoted by the "other" fields in the figure.

The A2H structure 300 is illustratively part of an A2H tree in which generation of a new snapshot creates a new node in the A2H tree. Such an A2H tree is also considered an example of a "snapshot tree," and other types of snapshot trees can be used in other embodiments. After generation of a new node in the A2H tree or other similar type of snapshot tree, all writes appear as new writes until an overwrite arrives. The A2H structure 300 can therefore be used to determine if a given write is the first write for a particular address of the storage volume since generation of a previous snapshot.

Other arrangements of entries and fields can be used, and the term "structure" as used herein is intended to be broadly construed so as to encompass numerous alternative data structures for maintaining information used in controlling generation of snapshots for at least one storage volume. For example, an A2H tree or other similar tree-like data structure is considered a type of structure as that term is broadly used herein. Accordingly, the particular A2H structure shown in FIG. 3 is only an example, and should not be construed as limiting in any way. Also, since the term "structure" as used herein is intended to be broadly construed, a given such structure can be implemented as a table, a tree or using any of a wide variety of different data structures or other storage arrangements.

In some embodiments, the storage system comprises an XtremIO™ storage array or other type of content addressable storage system suitably modified to incorporate differential-based snapshot generation techniques as disclosed herein.

An illustrative embodiment of such a content addressable storage system will now be described with reference to FIG. 4. In this embodiment, a content addressable storage system 405 comprises a plurality of storage devices 406 and an associated storage controller 408. The content addressable storage system 405 may be viewed as a particular implementation of the storage system 105, and accordingly is assumed to be coupled to host devices 102 of computer system 101 via network 104 within information processing system 100.

The storage controller 408 in the present embodiment is configured to implement differential-based snapshot generation functionality of the type previously described in conjunction with FIGS. 1 through 3.

The storage controller 408 includes distributed modules 412 and 416, which are configured to operate in a manner similar to that described above for respective corresponding modules 112 and 116 of storage controller 108. Module 412 in this embodiment is further assumed to incorporate storage volume counters that are similar to the storage volume counters 114 of storage controller 108.

Figure 4:
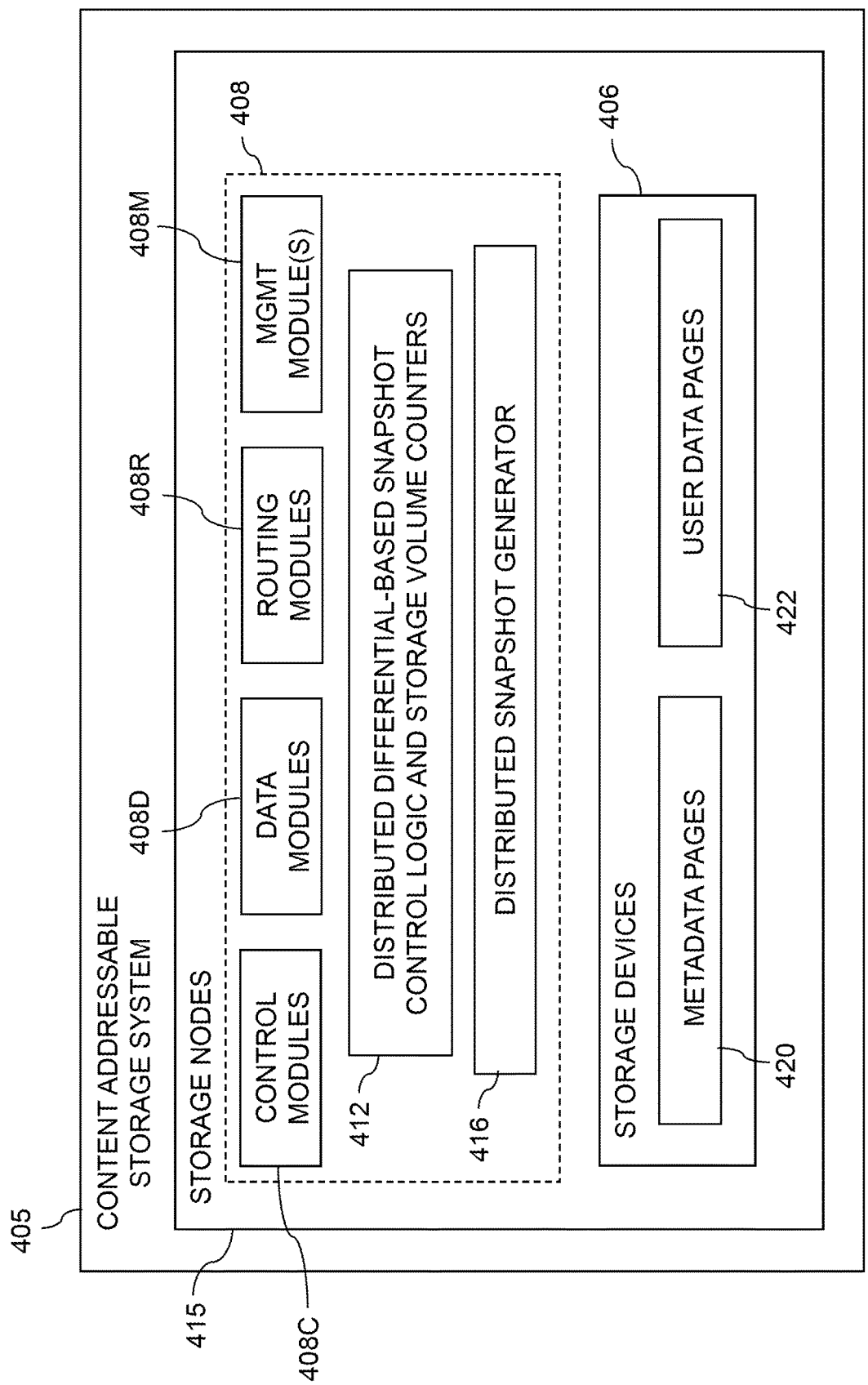
FIG. 4 shows a content addressable storage system having a distributed storage controller configured with functionality for snapshot generation control utilizing monitored differentials of respective storage volumes in an illustrative embodiment.

The content addressable storage system 405 in the FIG. 4 embodiment is implemented as at least a portion of a clustered storage system and includes a plurality of storage nodes 415 each comprising a corresponding subset of the storage devices 406. Other clustered storage system arrangements comprising multiple storage nodes can be used in other embodiments. A given clustered storage system may include not only storage nodes 415 but also additional storage nodes coupled to network 104. Alternatively, such additional storage nodes may be part of another clustered storage system of the system 100. Each of the storage nodes 415 of the storage system 405 is assumed to be implemented using at least one processing device comprising a processor coupled to a memory.

The storage controller 408 of the content addressable storage system 405 is implemented in a distributed manner so as to comprise a plurality of distributed storage controller components implemented on respective ones of the storage nodes 415. The storage controller 408 is therefore an example of what is more generally referred to herein as a "distributed storage controller." In subsequent description herein, the storage controller 408 may be more particularly referred to as a distributed storage controller.

Each of the storage nodes 415 in this embodiment further comprises a set of processing modules configured to communicate over one or more networks with corresponding sets of processing modules on other ones of the storage nodes 415. The sets of processing modules of the storage nodes 415 collectively comprise at least a portion of the distributed storage controller 408 of the content addressable storage system 405.

The modules of the distributed storage controller 408 in the present embodiment more particularly comprise different sets of processing modules implemented on each of the storage nodes 415. The set of processing modules of each of the storage nodes 415 comprises at least a control module 408C, a data module 408D and a routing module 408R. The distributed storage controller 408 further comprises one or more management ("MGMT") modules 408M. For example, only a single one of the storage nodes 415 may include a management module 408M. It is also possible that management modules 408M may be implemented on each of at least a subset of the storage nodes 415.

Each of the storage nodes 415 of the storage system 405 therefore comprises a set of processing modules configured to communicate over one or more networks with corresponding sets of processing modules on other ones of the storage nodes. A given such set of processing modules implemented on a particular storage node illustratively includes at least one control module 408C, at least one data module 408D and at least one routing module 408R, and possibly a management module 408M. These sets of processing modules of the storage nodes collectively comprise at least a portion of the distributed storage controller 408.

Communication links may be established between the various processing modules of the distributed storage controller 408 using well-known communication protocols such as IP, Transmission Control Protocol (TCP), and remote direct memory access (RDMA). For example, respective sets of IP links used in data transfer and corresponding messaging could be associated with respective different ones of the routing modules 408R.

Although shown as separate modules of the distributed storage controller 408, the modules 412 and 416 in the present embodiment are assumed to be distributed at least in part over at least a subset of the other modules 408C, 408D, 408R and 408M of the storage controller 408. Accordingly, at least portions of the differential-based snapshot generation functionality of the modules 412 and 416 may be implemented in one or more of the other modules of the storage controller 408. In other embodiments, the modules 412 and 416 may be implemented as stand-alone modules of the storage controller 408.

The storage devices 406 are configured to store metadata pages 420 and user data pages 422, and may also store additional information not explicitly shown such as checkpoints and write journals. The metadata pages 420 and the user data pages 422 are illustratively stored in respective designated metadata and user data areas of the storage devices 406. Accordingly, metadata pages 420 and user data pages 422 may be viewed as corresponding to respective designated metadata and user data areas of the storage devices 406.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 420 and the user data pages 422.

The user data pages 422 are part of a plurality of LUNs configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 422 can include any type of user data that may be utilized in the system 100. The term "user data" herein is therefore also intended to be broadly construed.

A given storage volume for which snapshots are generated using modules 412 and 416 illustratively comprises a set of one or more LUNs, each including multiple ones of the user data pages 422 stored in storage devices 406.

The content addressable storage system 405 in the embodiment of FIG. 4 is configured to generate hash metadata providing a mapping between content-based digests of respective ones of the user data pages 422 and corresponding physical locations of those pages in the user data area. Content-based digests generated using hash functions are also referred to herein as "hash digests." Such hash digests or other types of content-based digests are examples of what are more generally referred to herein as "content-based signatures" of the respective user data pages 422. The hash metadata generated by the content addressable storage system 405 is illustratively stored as metadata pages 420 in the metadata area. The generation and storage of the hash metadata is assumed to be performed under the control of the storage controller 408.

Each of the metadata pages 420 characterizes a plurality of the user data pages 422. For example, a given set of user data pages representing a portion of the user data pages 422 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 406.

Each of the metadata pages 420 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 420 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 405 is illustratively distributed among the control modules 408C.

The differential-based snapshot generation functionality provided by modules 412 and 416 in this embodiment is assumed to be distributed across multiple distributed processing modules, including at least a subset of the processing modules 408C, 408D, 408R and 408M of the distributed storage controller 408.

For example, the management module 408M of the storage controller 408 may include a differential-based snapshot control logic instance that engages corresponding differential-based snapshot control logic instances in all of the control modules 408C and routing modules 408R in order to implement a differential-based snapshot generation process.

In some embodiments, the content addressable storage system 405 comprises an XtremIO™ storage array suitably modified to incorporate techniques for differential-based generation of snapshots and performance of automated actions based at least in part on those snapshots as disclosed herein.

In arrangements of this type, the control modules 408C, data modules 408D and routing modules 408R of the distributed storage controller 408 illustratively comprise respective C-modules, D-modules and R-modules of the XtremIO™ storage array. The one or more management modules 408M of the distributed storage controller 408 in such arrangements illustratively comprise a system-wide management module ("SYM module") of the XtremIO™ storage array, although other types and arrangements of system-wide management modules can be used in other embodiments. Accordingly, differential-based snapshot generation functionality in some embodiments is implemented under the control of at least one system-wide management module of the distributed storage controller 408, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page.

Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 1024 slices distributed evenly across the C-modules, and there are a total of 16 C-modules in a given implementation, each of the C-modules "owns" 1024/16=64 slices. In such arrangements, different ones of the slices are assigned to different ones of the control modules 408C such that control of the slices within the storage controller 408 of the storage system 405 is substantially evenly distributed over the control modules 408C of the storage controller 408.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 405 each illustratively comprise one or more IO operations directing that at least one data item of the storage system 405 be written to in a particular manner. A given write request is illustratively received in the storage system 405 from a host device, illustratively one of the host devices 102. In some embodiments, a write request is received in the distributed storage controller 408 of the storage system 405, and directed from one processing module to another processing module of the distributed storage controller 408. For example, a received write request may be directed from a routing module 408R of the distributed storage controller 408 to a particular control module 408C of the distributed storage controller 408. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 415 communicate with one another over a high-speed internal network such as an InfiniBand network. The C-modules, D-modules and R-modules coordinate with one another to accomplish various IO processing tasks.

The write requests from the host devices identify particular data pages to be written in the storage system 405 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 405 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 405.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 406. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 405 correspond to respective physical blocks of a physical layer of the storage system 405. The user data pages of the logical layer are organized by LBA and have reference via respective content-based signatures to particular physical blocks of the physical layer.

Each of the physical blocks has an associated reference count that is maintained within the storage system 405. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 408C, 408D, 408R and 408M as shown in the FIG. 4 embodiment is presented by way of example only. Numerous alternative arrangements of processing modules of a distributed storage controller may be used to implement differential-based snapshot generation functionality in a clustered storage system in other embodiments.

Additional examples of content addressable storage functionality implemented in some embodiments by control modules 408C, data modules 408D, routing modules 408R and management module(s) 408M of distributed storage controller 408 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of a storage system with differential-based snapshot generation functionality as disclosed herein can provide a number of significant advantages relative to conventional arrangements.

For example, some embodiments are advantageously configured to control generation of snapshots for a given storage volume of the storage system based at least in part on an amount of data in the storage volume that has been written since a previous snapshot of that storage volume was taken. Such arrangements dynamically adapt the snapshot generation in the storage system to better match the manner in which the data of the storage volume is changing over time, thereby conserving computational and memory resources of the storage system while also providing improved data protection.

Accordingly, illustrative embodiments disclosed herein can considerably reduce the amounts of storage system computational and memory resources that are consumed in generating and storing snapshots, thereby leading to improved storage system performance.

Functionality for differential-based snapshot generation and associated automated processing based at least in part on the resulting snapshots can be implemented in a storage system, in a host device, or partially in a storage system and partially in a host device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with differential-based snapshot generation functionality will now be described in greater detail with reference to FIGS. 5 and 6. Although described in the context of system 100, these platforms may also be used to implement at least portions of other information processing systems in other embodiments.

Figure 5:
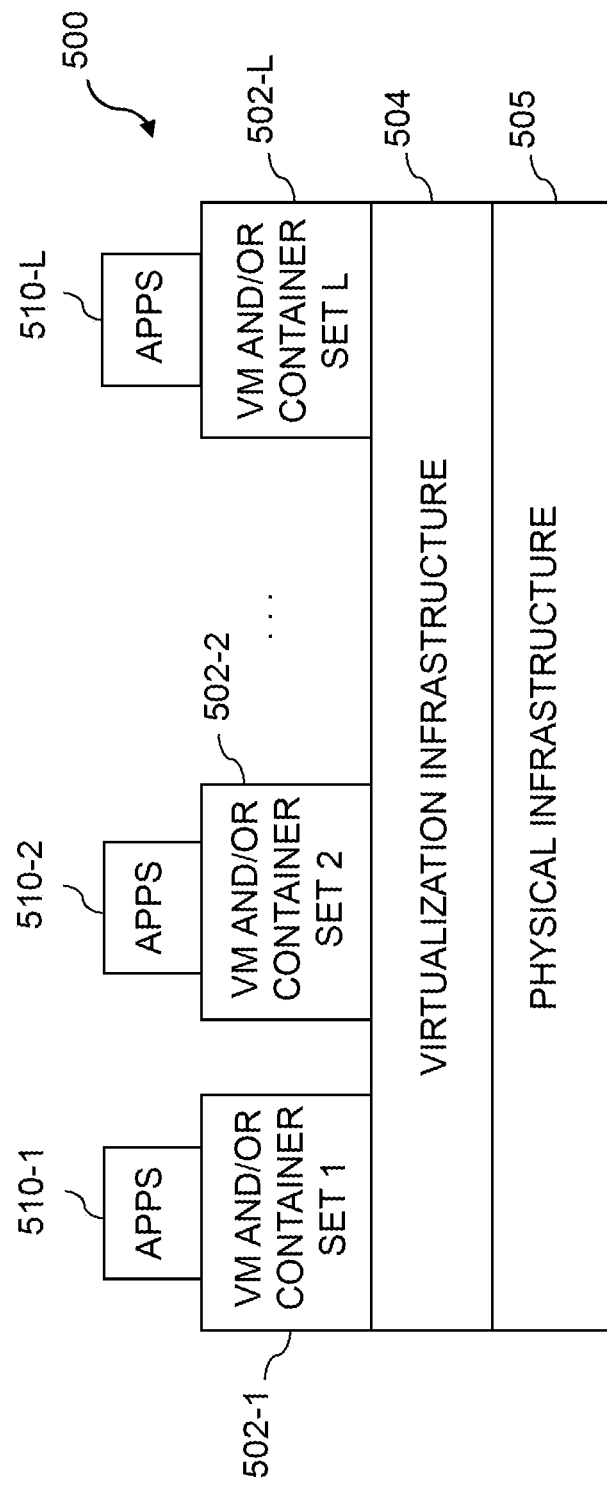
FIGS. 5 and 6 show examples of processing platforms that may be utilized to implement at least a portion of an information processing system in illustrative embodiments.
Figure 6:
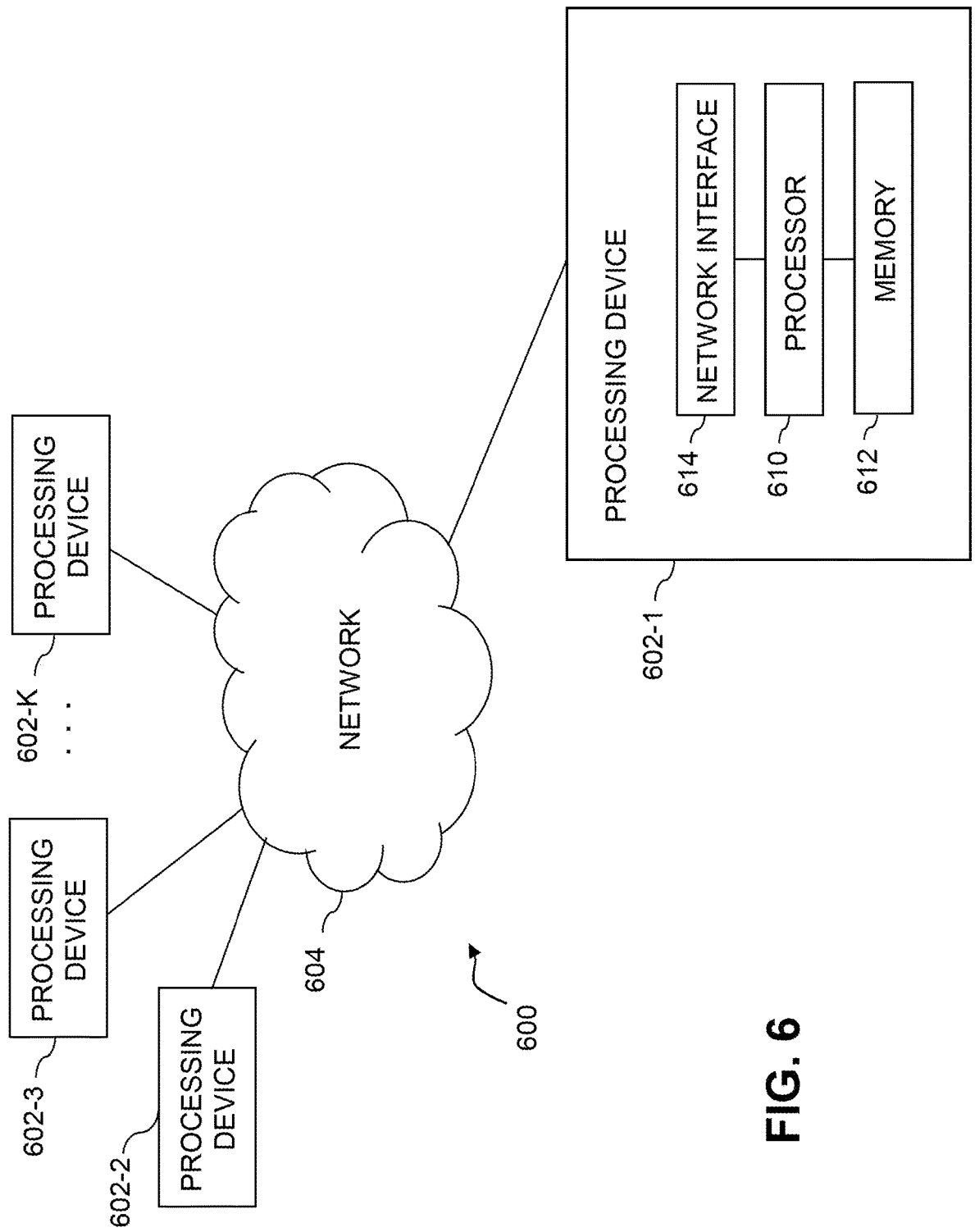

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide differential-based snapshot generation functionality of the type described above for one or more processes running on a given one of the VMs. For example, each of the VMs can implement differential-based snapshot control logic and associated storage volume counters for providing differential-based snapshot generation functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide differential-based snapshot generation functionality of the type described above. For example, a container host device supporting multiple containers of one or more container sets can implement one or more instances of differential-based snapshot control logic and associated storage volume counters for providing differential-based snapshot generation functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the differential-based snapshot generation functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, differential-based snapshot generation processes and associated control logic and tables. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage devices and a storage controller;
the storage controller being configured:
to monitor a differential between a storage volume of the storage system and a previous snapshot generated for that storage volume; and
responsive to the monitored differential satisfying one or more specified conditions, to generate a subsequent snapshot for the storage volume;
wherein monitoring the differential between the storage volume of the storage system and the previous snapshot generated for that storage volume comprises:
maintaining a first counter indicative of a total amount of data in the storage volume;
maintaining a second counter indicative of an amount of data in the storage volume that has been written since generation of the previous snapshot; and
monitoring values of the first and second counters;
wherein generating the subsequent snapshot for the storage volume responsive to the monitored differential satisfying one or more specified conditions comprises generating the subsequent snapshot responsive to the value of the second counter satisfying a specified condition relative to the value of the first counter; and wherein the storage controller comprises at least one processing device comprising a processor coupled to a memory.

2. The apparatus of claim 1 wherein the storage volume comprises at least one logical storage volume comprising at least a portion of a physical storage space of one or more of the storage devices.

3. The apparatus of claim 1 wherein generating the subsequent snapshot for the storage volume responsive to the monitored differential satisfying one or more specified conditions comprises:
scheduling the generation of the subsequent snapshot; and
generating the subsequent snapshot in accordance with the scheduling.

4. The apparatus of claim 1 wherein the one or more specified conditions comprise a specified minimum amount of change in the storage volume relative to the previous snapshot of the storage volume.

5. The apparatus of claim 4 wherein the specified minimum amount of change in the storage volume is specified in terms of at least one of:
a minimum number of storage units of the storage volume that have changed since generation of the previous snapshot; and
a minimum percentage of the storage volume that has changed since generation of the previous snapshot.

6. The apparatus of claim 1 wherein generating the subsequent snapshot for the storage volume responsive to the monitored differential satisfying one or more specified conditions comprises generating the subsequent snapshot responsive to the value of the second counter exceeding a specified threshold that is determined based at least in part on the value of the first counter.

7. The apparatus of claim 1 wherein the value of the second counter satisfying a specified condition relative to the value of the first counter comprises the value of the second counter reaching a specified percentage of the value of the first counter.

8. The apparatus of claim 1 wherein the second counter is reset in conjunction with the generation of the subsequent snapshot.

9. The apparatus of claim 1 wherein maintaining a given one of the first and second counters comprises:
detecting one or more overwrites of existing data of the storage volume; and
leaving the value of the given counter unchanged responsive to each of the one or more detected overwrites.

10. The apparatus of claim 1 wherein maintaining the second counter comprises:
accessing an address-to-hash structure for the storage volume;
determining if one or more portions of the storage volume have changed since generation of the previous snapshot based at least in part on respective corresponding entries of the address-to-hash structure; and
updating the second counter based at least in part on the determining.

11. The apparatus of claim 1 wherein the previous snapshot and the subsequent snapshot comprise respective point-in-time replicas of the entire storage volume.

12. A method comprising:
monitoring a differential between a storage volume of a storage system and a previous snapshot generated for that storage volume; and
responsive to the monitored differential satisfying one or more specified conditions, generating a subsequent snapshot for the storage volume;
wherein monitoring the differential between the storage volume of the storage system and the previous snapshot generated for that storage volume comprises:
maintaining a first counter indicative of a total amount of data in the storage volume;
maintaining a second counter indicative of an amount of data in the storage volume that has been written since generation of the previous snapshot; and
monitoring values of the first and second counters;
wherein generating the subsequent snapshot for the storage volume responsive to the monitored differential satisfying one or more specified conditions comprises generating the subsequent snapshot responsive to the value of the second counter satisfying a specified condition relative to the value of the first counter; and
wherein the method is implemented by at least one processing device comprising a processor coupled to a memory.

13. The method of claim 12 wherein generating the subsequent snapshot for the storage volume responsive to the monitored differential satisfying one or more specified conditions comprises generating the subsequent snapshot responsive to the value of the second counter exceeding a specified threshold that is determined based at least in part on the value of the first counter.

14. The method of claim 12 wherein the previous snapshot and the subsequent snapshot comprise respective point-in-time replicas of the entire storage volume.

15. A computer program product comprising a non-transitory processor-readable storage medium having stored therein program code of one or more software programs, wherein the program code when executed by at least one processing device causes said at least one processing device:
to monitor a differential between a storage volume of a storage system and a previous snapshot generated for that storage volume; and
responsive to the monitored differential satisfying one or more specified conditions, to generate a subsequent snapshot for the storage volume;
wherein monitoring the differential between the storage volume of the storage system and the previous snapshot generated for that storage volume comprises:
maintaining a first counter indicative of a total amount of data in the storage volume;
maintaining a second counter indicative of an amount of data in the storage volume that has been written since generation of the previous snapshot; and
monitoring values of the first and second counters; and
wherein generating the subsequent snapshot for the storage volume responsive to the monitored differential satisfying one or more specified conditions comprises generating the subsequent snapshot responsive to the value of the second counter satisfying a specified condition relative to the value of the first counter.

16. The computer program product of claim 15 wherein generating the subsequent snapshot for the storage volume responsive to the monitored differential satisfying one or more specified conditions comprises generating the subsequent snapshot responsive to the value of the second counter exceeding a specified threshold that is determined based at least in part on the value of the first counter.

17. The computer program product of claim 15 wherein the value of the second counter satisfying a specified condition relative to the value of the first counter comprises the value of the second counter reaching a specified percentage of the value of the first counter.

18. The computer program product of claim 15 wherein the second counter is reset in conjunction with the generation of the subsequent snapshot.

19. The computer program product of claim 15 wherein maintaining a given one of the first and second counters comprises:
- detecting one or more overwrites of existing data of the storage volume; and
- leaving the value of the given counter unchanged responsive to each of the one or more detected overwrites.

20. The computer program product of claim 15 wherein maintaining the second counter comprises:
- accessing an address-to-hash structure for the storage volume;
- determining if one or more portions of the storage volume have changed since generation of the previous snapshot based at least in part on respective corresponding entries of the address-to-hash structure; and
- updating the second counter based at least in part on the determining.

* * * * *